United States Patent
Ekdunge et al.

(10) Patent No.: US 10,464,027 B2
(45) Date of Patent: Nov. 5, 2019

(54) CARBON MONOXIDE OXIDATION DEVICE

(71) Applicant: POWERCELL SWEDEN AB, Göteborg (SE)

(72) Inventors: Per Ekdunge, Västra Frölunda (SE); Federico Ghirelli, Göteborg (SE); Ida Toftefors, Göteborg (SE)

(73) Assignee: POWERCELL SWEDEN AB, Göteborg (SE)

( * ) Notice: Subject to any disclaimer, the term of this patent is extended or adjusted under 35 U.S.C. 154(b) by 214 days.

(21) Appl. No.: 15/528,754

(22) PCT Filed: Dec. 2, 2015

(86) PCT No.: PCT/SE2015/051302
§ 371 (c)(1),
(2) Date: May 22, 2017

(87) PCT Pub. No.: WO2016/089295
PCT Pub. Date: Jun. 9, 2016

(65) Prior Publication Data
US 2019/0099727 A1 Apr. 4, 2019

(30) Foreign Application Priority Data
Dec. 4, 2014 (SE) ....................... 1451476

(51) Int. Cl.
*B01F 5/04* (2006.01)
*B01F 5/06* (2006.01)
(Continued)

(52) U.S. Cl.
CPC .............. *B01F 5/0473* (2013.01); *B01F 3/02* (2013.01); *B01F 5/0617* (2013.01); *B01J 8/008* (2013.01);
(Continued)

(58) Field of Classification Search
CPC ...... B01F 3/00; B01F 3/02; B01F 5/00; B01F 5/04; B01F 5/0403; B01F 5/0471;
(Continued)

(56) References Cited

U.S. PATENT DOCUMENTS

2006/0115394 A1 6/2006 Yasushi
2010/0101219 A1 4/2010 Noller et al.

FOREIGN PATENT DOCUMENTS

| CN | 202917430 U | 5/2013 |
| DE | 10 2008 053669 A1 | 5/2010 |
| WO | 2004062775 A1 | 7/2004 |

OTHER PUBLICATIONS

International Search Report (dated Jun. 3, 2016) for corresponding International App. PCT/SE2015/051302.
(Continued)

*Primary Examiner* — Natasha E Young
(74) *Attorney, Agent, or Firm* — WRB-IP LLP

(57) ABSTRACT

A carbon monoxide oxidation device for oxidizing carbon monoxide contained in a hydrogen rich reformat gas includes a gas stream perturbation device designed as at least one propeller-shaped plate with a plate portion having a surface facing the gas stream and at least one blade which is connected to the plate portion and has a leading edge and an effluent edge, wherein a surface defined between leading edge and effluent edge is inclined in relation to the surface of the plate portion with a predetermined blade inclination angle, thereby defining at least one opening in the plate.

10 Claims, 3 Drawing Sheets

(51) Int. Cl.
  *B01F 3/02* (2006.01)
  *B01J 8/00* (2006.01)
  *B01J 8/02* (2006.01)
  *C01B 3/58* (2006.01)

(52) U.S. Cl.
  CPC .......... *B01J 8/0221* (2013.01); *B01J 8/0278* (2013.01); *C01B 3/583* (2013.01); *B01F 2005/0637* (2013.01); *B01J 2208/00849* (2013.01); *B01J 2208/00938* (2013.01); *C01B 2203/044* (2013.01); *C01B 2203/047* (2013.01)

(58) Field of Classification Search
  CPC ........ B01F 5/0473; B01F 5/06; B01F 5/0602; B01F 5/0609; B01F 5/061; B01F 5/0616; B01F 5/0617; B01F 2005/0635; B01F 2005/0637; B01J 8/00; B01J 8/008; B01J 8/02; B01J 8/0207; B01J 8/0221; B01J 8/0278; B01J 2208/00796; B01J 2208/00823; B01J 2208/00831; B01J 2208/00849; B01J 2208/00938; C01B 3/00; C01B 3/50; C01B 3/56–583; C01B 2203/04; C01B 2203/0435; C01B 2203/044; C01B 2203/0465; C01B 2203/047

See application file for complete search history.

(56) References Cited

OTHER PUBLICATIONS

Alex Stojkovic: "What Is a Diesel Oxidation Catalyst?—Nett Technologies", Mar. 25, 2013 (Mar. 25, 2013), XP855275891, Retrieved from the Internet: URL:http://www.nettinc.com/information/emissions-faq/what-is-a-diesel-oxidation-catalyst.
Indian Official Action (dated Dec. 24, 2018) for corresponding Indian App. 201727019324.
Canadian Official Action (dated Mar. 26, 2018) for corresponding Canadian App. 2967938.
Korean Official Action (dated May 30, 2018) for corresponding Korean App. 10-2017-7013287.
Chinese Official Action (dated Jun. 20, 2019) for corresponding Chinese App. 201580065802.3.

CARBON MONOXIDE OXIDATION DEVICE

The present application is a U.S. national stage application of International Application PCT/SE2015/051302, filed Dec. 2, 2015, now WO2016/089295, which claims priority to Swedish App. SE 1451476-4, filed Dec. 4, 2014, both of which are hereby incorporated by reference.

BACKGROUND AND SUMMARY

The present invention relates to a carbon monoxide oxidation device.

Fuel cells electrochemically produce electricity from reactants supplied externally thereto. Particularly, hydrogen is often used as fuel and is supplied to the fuel cell's anode. Oxygen or air is used as oxidant and is supplied to the fuel cell's cathode. The hydrogen may be stored in a hydrogen storage but for mobile application it has proven useful to produce the hydrogen from liquid hydrocarbon fuels, e.g. from diesel in a fuel reformer. Unfortunately, the hydrogen rich reformat gas exiting the fuel reformer contains significant amounts of carbon monoxide that is toxic to the catalyst used in the fuel cell and must be therefore removed or at least reduced to a very low concentration.

It is known that the carbon monoxide, content of the reformate can be reduced by the so-called "water-gas shift" reaction that usually takes place in one or more separate shift reactors located downstream from the reformer. In the water-gas shift reaction, water (i.e., steam) reacts with the carbon monoxide in the reformate according to the following ideal exothermic shift reaction:

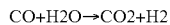
$$CO + H_2O \rightarrow CO_2 + H_2$$

Additionally, it is known to arrange two water-gas shift reactors in series, wherein the first shift reactor is a high-temperature, adiabatic shift reactor in which the reformate enters the reformer at a first temperature and exits it at a somewhat higher temperature. Thereafter, the reformate is cooled and enters a second shift reactor which is an isothermal, low temperature shift reactor in which the inlet and outlet temperatures of the reformate is essentially the same. These shift reactors usually comprise a housing containing a catalyst bed through which the reformate flows, and to which additional steam may be added or wherein the steam contained in the reformate gas is used.

Additionally or alternatively, it is known to use at least one preferential oxidation reactor (PrOx) in which the carbon monoxide content of hydrogen-rich reformate is selectively reacted with air at a temperature of below 280° C. Thereby, the carbon monoxide concentration in the reformate may be reduced to the desired amount of below 0.00005 mole fraction in order to use the reformate in the fuel cell without poisoning the fuel cell catalyst. In the PrOx reactor, the air preferentially oxidizes the carbon monoxide in the presence of the hydrogen, but without consuming/oxidizing substantial quantities of the hydrogen. The PrOx reaction is exothermic and proceeds as follows:

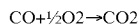
$$CO + \tfrac{1}{2}O_2 \rightarrow CO_2$$

When the system reaches steady state, and the carbon monoxide level is low enough, the PrOx reactor effluent is supplied to the fuel cell. Before the carbon monoxide level is low enough, the PrOx effluent is shunted around the fuel cell for temporary use elsewhere in the system.

In all of the above described systems, the efficiency of the carbon monoxide oxidation depends on the homogeneity of the gas mixture of reformat gas and the oxidation agent (i.e. air or steam). Additionally, it is desired to minimize the addition of oxidation agent as excess oxygen or steam reacts with the hydrogen and therefore decreases the hydrogen amount in the hydrogen rich gas useable for the fuel cell. Additionally, it has been shown that particularly in the known water gas shift reactors the temperature distribution should be as constant as possible over the cross section of the reactor for establishing a maximum efficiency.

From the state of the art, e.g. from US 2006/115394 a carbon monoxide oxidizer is disclosed which comprises a mixing unit that is adapted to mix at least two kind of gases as a mixed gas. Thereby, the mixing unit comprises a stackered body of a plurality of plates, wherein the stackered body comprises a rotating passage provided by through hole formed in each of the plates to rotate a flow of the mixed gas. Additionally, the document discloses an oxidant gas supply unit in form of an orifice plate with a rectangular opening in a center and radially arranged oxidant channels, which swirls an oxidant gas toward the opening. The mixing unit comprising the stackered plates is arranged downstream of the orifice plate, whereby a chamber is defined between the mixing unit and the orifice plate. The mixing unit in turn is arranged in close vicinity to the catalyst.

The disadvantage of the known carbon monoxide oxidizer is that the orifice plate, the chamber and particularly the stackered plates of the mixing unit require a lot of space, whereby the carbon monoxide oxidizer as such becomes very bulky.

It is therefore desirable to provide a carbon monoxide oxidation device requiring less space and providing an optimal mixing of reformat gas and/or oxidizing agent and/or an improved temperature distribution over the cross section of the oxidation device. Additionally, it is desirable to provide a carbon monoxide oxidation device which has a low pressure drop from the inlet to the outlet, whereby the energy consumption of the carbon monoxide oxidation device may be reduced.

A carbon monoxide oxidation device according to an aspect of the present invention is provided.

In the present application a carbon monoxide oxidation device for oxidizing carbon monoxide contained in the hydrogen rich reformat gas is proposed. The below described oxidation device comprises a housing which incorporates an oxidation catalyst for oxidizing the carbon monoxide of the reformat gas by means of an oxidizing agent to carbon dioxide. Upstream of the catalyst the housing comprises at least one gas inlet for providing a gas stream of at least said reformat gas into the housing, and downstream of the catalyst the housing comprises a gas outlet for exiting treated gas from the housing. The housing further incorporates a gas stream perturbation device which is arranged upstream of the catalyst and adapted to provide a perturbation in the gas stream.

Even if indicated as reformate gas it is clear for a person skilled in the art that any fluid may be used, not only gaseous fluids.

In order to provide a carbon monoxide oxidation device having a reasonable installation space, the gas stream perturbation device is designed as at least one propeller-shaped plate with a plate portion having a surface facing the gas stream and at least one blade which is connected to the plate portion and has a leading edge and an effluent edge, wherein a surface defined between the leading edge and the effluent edge is inclined in relation to the surface of the plate portion with a predetermined blade inclination angle, whereby at least one opening in the plate is defined. By the new design of the gas stream perturbation device it is possible to reduce the space demand of the carbon monoxide oxidation device significantly.

Additionally, the described gas stream perturbation device provides an improved mixing of the gas stream flowing through the opening defined by the inclined blade. Further, the inventive gas perturbation device causes only a low pressure drop, whereby energy necessary for the operation of the carbon monoxide device, e.g. for operation of an air compressor may be reduced, which in turn renders the carbon monoxide oxidation device more cost effective.

According to a preferred embodiment the at least one blade is inclined in circumferential direction. By the inclination in circumferential direction, a gas stream streaming onto the gas stream perturbation device is guided through the opening and enters a space downstream of the gas stream perturbation device in a tangential direction. Thereby, a swirling motion of the gas stream is introduced, which provides a homogenous mixture of the gas stream downstream of the gas stream perturbation device.

It should be noted that in general a mixture may be a mixture of at least two different types of fluids, but "mixture" may also be understood in that way that the complete gas streaming through the reactor is mixed through, whereby the homogeneity of the gas stream may be increased and a more even temperature distribution may be provided.

According to a further preferred embodiment the opening is defined between the leading edge and the effluent edge of the blade. Thereby, a preferably substantially axial aligned opening is defined which provides the desired perturbation downstream of the perturbation device. Additionally, it is preferred if the leading edge and the effluent edge are axially aligned or overlap each other so that the desired perturbation is achieved.

Further, it is preferred if the gas stream perturbation device is stationary mounted inside the housing with its outer circumferential rim contacting and being fluidtightly sealed to an inner wall of the housing. Thereby, the gas which reaches the gas stream perturbation device is forced to stream through the at least one opening, whereby the above described perturbation is provided.

According to a further preferred embodiment the plate portion of the gas stream perturbation device is centrally arranged in the housing and the at least one blade is arranged between the centrally arranged plate portion and an inner wall of the housing. By arranging the openings in an outer circumferential portion of the oxidation device, a particularly well and homogenous mixing may be achieved.

According to a further preferred embodiment the gas stream perturbation device comprises at least two, preferably four equally spaced blades correspondingly defining two, respectively four openings, wherein the openings are arranged between the leading edge and the effluent edge of adjacent blades. This design preferably ensures that a pressure drop may be kept low which in turn allows for a reduced compressor power. This in turn increases the overall efficiency of the whole system.

According to a further preferred embodiment the carbon monoxide oxidation device has a substantially circular or elliptical cross section and the gas stream perturbation device is substantially disk-shaped. A cylindrically shaped housing is preferred as its circular or elliptical cross section supports the circular perturbation motion of the gas downstream of the gas stream perturbation device.

According to a further preferred embodiment the gas stream perturbation device comprises a first and a second propeller-shaped plate, wherein the first and second openings provided by the inclined plates are misaligned. The double plate arrangement allows for a homogenous mixing as well as for a design of the reformer where an oxidizing agent inlet is not provided upstream of the gas stream perturbation device but is arranged between the first and the second plate. Thereby, the first plate may provide a perturbing motion of the gas stream into which the oxidation agent is introduced. Thereby, the oxidation agent is already premixed with the reformate gas. The second plate arranged downstream of the first plate and of the oxidizing agent inlet in turn even improves the mixing of oxidizing agent and of the reformate gas.

Even if it is preferred to arrange the oxidation agent inlet upstream of the gas stream perturbation device but downstream of the gas inlet it is also possible to arrange the oxidizing agent upstream of the gas inlet whereby a mixture of reformat gas and oxidizing agent is introduced into the housing.

According to a further preferred embodiment the gas stream perturbation device is arranged in a predetermined distance from the catalyst, whereby a perturbation development chamber for the gas stream is provided. Thereby, it is preferred if the gas stream perturbation device is arranged in a distance D from the catalyst, wherein a ratio of the distance D to a length L of the housing of the carbon monoxide oxidation device is greater as or equal to 0,2:

$$D/L \geq 0,2.$$

This arrangement allows a sufficiently large perturbation development chamber without increasing the overall length of the carbon monoxide oxidation device.

Further, it should be noted that a size of the at least one opening defined by the inclination angel of the at least one inclined blade predetermined blade angle is calibrated to the expected gas flow and/or the volume of the distribution development chamber and/or the total number of blades and/or the diameter of the housing and/or the length of the housing. Thereby, it is preferred that a volume of the perturbation development chamber, particularly defined by the distance between the gas stream perturbation device and the catalyst is calibrated to the expected gas flow and/or a diameter of the housing and/or a length of the housing.

The carbon monoxide device may be designed as high-temperature WGS reactor, low-temperature WGS reactor, or as PrOx reactor. The new design of the gas stream perturbation device increase the efficiency in all carbon monoxide oxidation systems.

Exemplarily, the carbon monoxide oxidation device may be a high temperature water gas shift reactor operating at a temperature of above 280° C., comprising a noble catalyst, e.g. platinum of a platinum containing composition, or a non-noble metal catalyst, such as a mixture of $Fe_3O_4$, $Cr_2O_3$, and $MgO$. Steam is used as oxidizing agent, which may be introduced into the housing by a separate steam inlet upstream of at least one propeller-shaped plate of the gas stream perturbation device. Alternatively, no steam is added to the reformate gas, but the steam provided during the fuel reforming and still contained in the reformate gas may be used. In case no steam is added, the gas stream perturbation device acts mainly as temperature distribution device which provides a homogenous and even temperature distribution.

Steam from the reformate or as addition may also be used for a low temperature water gas shift reactor, which operates at a temperature of below 280° C. Also, the low temperature water gas shift reactor comprises a noble or non-noble catalyst, but in a different composition than the high temperature water gas shift reactor.

According to a further embodiment, the carbon monoxide device is a preferential oxidation reactor PrOx operating at a temperature of below 280° C. The PrOx comprises a heterogeneous catalyst. The catalysts may include noble metals such as platinum, platinum/iron, platinum/ruthenium, gold nanoparticles as well as copper oxide/ceramic conglomerate catalysts. In contrast to the water gas shift reactor oxygen or air is used as oxidizing agent, which is introduced into the housing by a separate oxygen/air inlet upstream of at least one propeller-shaped plate of the gas stream perturbation device. Additionally or alternatively, reformat gas and oxygen/air may also be introduced as pre-mixture into the housing of the PrOx through the gas inlet.

Further preferred embodiments are defined in the description, the drawings and the attached claims.

BRIEF DESCRIPTION OF THE DRAWINGS

In the following the invention will be described by means of exemplary embodiments shown in the Figures. Thereby, the embodiments are not intended to define the scope of protection, which is solely defined by the attached claims.

The Figures show.

In the following similar or similarly functioning elements are indicated with the same reference signs.

DETAILED DESCRIPTION

Figure 1:
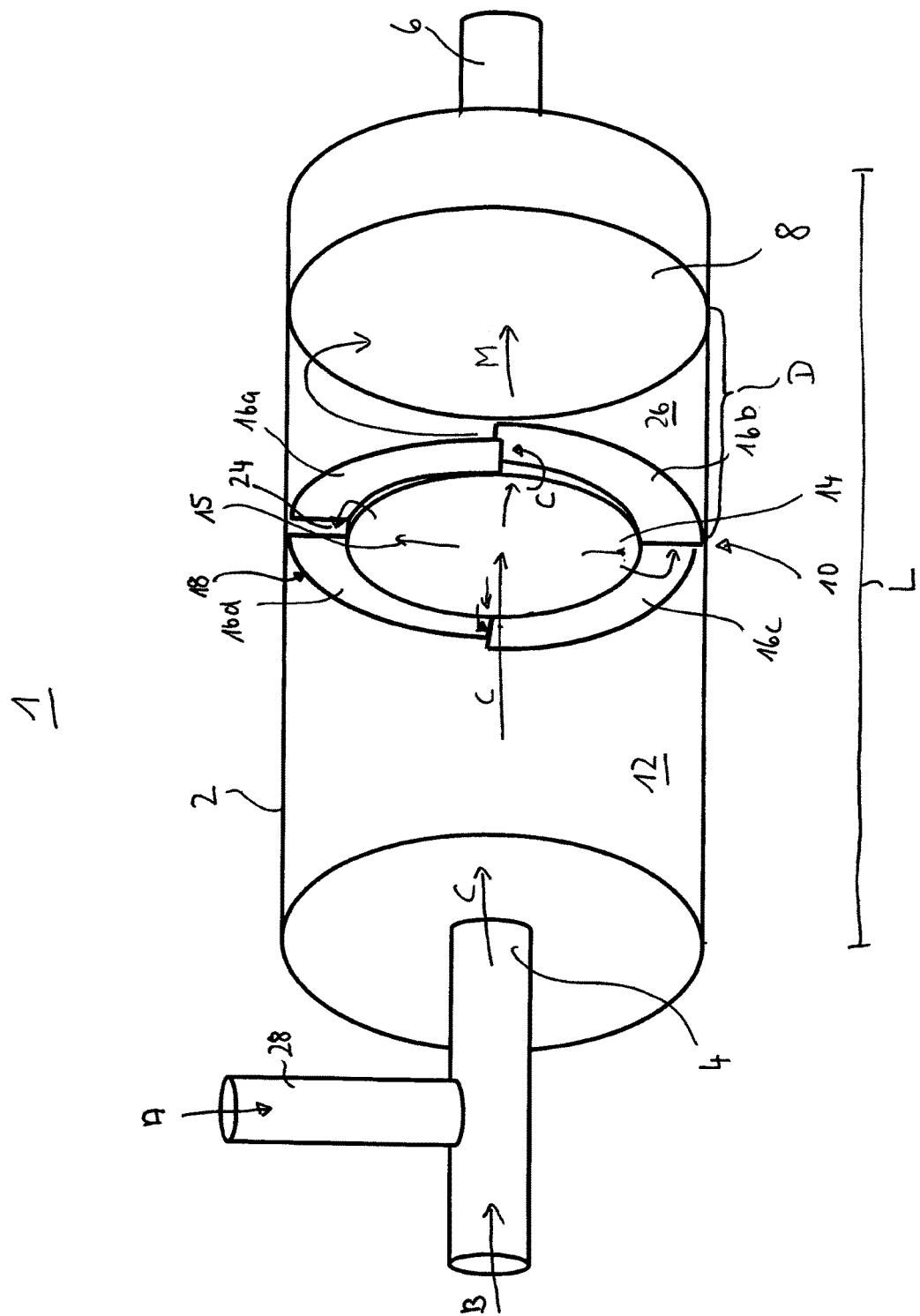
FIG. 1: a first embodiment of the inventive carbon monoxide oxidation device.

FIG. 1 shows a schematic view of a carbon monoxide oxidation device 1 such as a water gas shift reactor or a preferential oxidation reactor. The carbon monoxide oxidation device usually comprises a housing 2, which may have a cylindrical shape as shown in FIG. 1, but may also have a rectangular or polygonal cross section. The housing 2 further comprises a gas inlet 4 for providing a gas or fluid into the housing, and a gas outlet 6 for exiting treated gas or fluid. The housing 2 further incorporates a catalyst 8 which is adapted to treat the gas streaming through the carbon monoxide oxidation device.

Carbon monoxide oxidizers as shown in FIG. 1 are preferably used for purifying a hydrogen rich reformat gas being generated by a hydrocarbon fuel reactor for use in a fuel cell. Since the reformat gas exiting the hydrocarbon fuel reactor still contains a significant amount of a carbon monoxide, which is toxic for a catalyst of the fuel cell, the carbon monoxide must be removed from the reformat gas. This is usually done in an at least two step process of a water gas shift reaction followed by a preferential oxidation reaction. Thereby, the carbon monoxide amount in the reformat gas is lowered to less than 0.00005 mol fractions which ensures that the fuel cell catalyst will not be poisoned. In the water gas shift reaction water usually in form of steam reacts with the carbon monoxide in the reformat gas according to the following ideal exothermic shift reaction:

$$CO + H_2O \rightarrow CO_2 + H_2$$

For further lowering the carbon monoxide concentration following the water gas shift reaction a preferential oxidation reaction is performed, wherein the carbon monoxide is oxidized with air according to the following exothermic reaction:

$$CO + \tfrac{1}{2} O_2 \rightarrow CO_2.$$

The design or the arrangement of elements in the carbon monoxide oxidation devices are similar but the water gas shift reactors and the preferential oxidation reactors differ in the oxidation agent used as well as in the material for the catalyst 8.

In all known carbon monoxide oxidation devices the efficiency of the device depends strongly on the homogeneity of the mixture of the carbon monoxide containing reformat gas with the corresponding oxidation agent. Additionally, it is desired that the gas streaming through the reactor has an evenly distributed temperature over the cross section of the reactor, whereby damaging of the catalyst due to hot spots is avoided.

For achieving the desired homogenous mixture and the even temperature distribution, the carbon monoxide oxidation device shown in FIG. 1 comprises a gas stream perturbation device 10 which is arranged upstream of the catalyst but downstream of the reformat gas inlet 4. As can be further seen in FIG. 1 the oxidizing agent A is premixed with the reformat gas B upstream of the gas inlet 4 and enters the housing 2 as mixture C. From the inlet 4 the reformat gas/oxidizing agent mixture C streams into a chamber 12 which is blocked by the gas stream perturbation device 10. Alternatively, the oxidizing agent A may also be mixed with the reformate gas B in the chamber 12 downstream of the gas inlet 4. According to a further alternative, particularly in case the carbon monoxide oxidation device is designed as water gas shift reactor, steam already contained in the reformate gas may be used as oxidizing agent. A separate oxidizing agent inlet may in this case be omitted.

Figure 2:
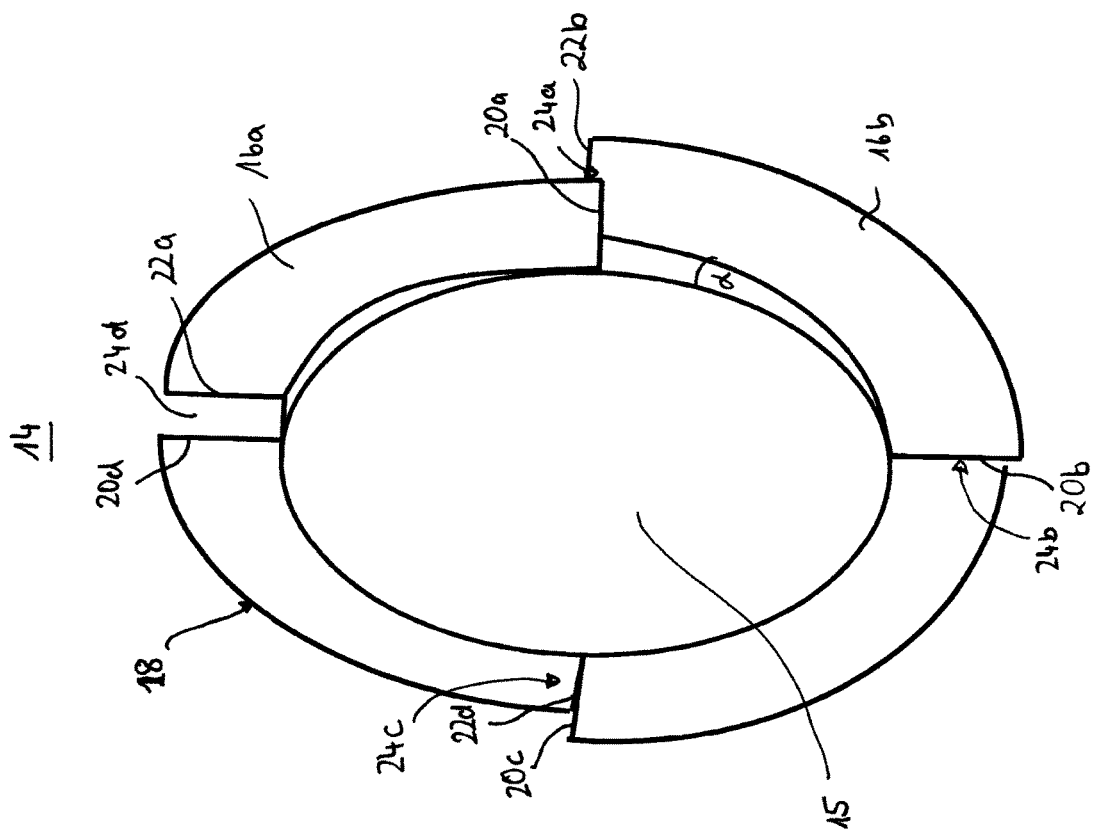
FIG. 2: an enlarged schematic view of the gas stream perturbation device incorporated in the carbon monoxide oxidation device shown in FIG. 1.

As can be further seen from FIG. 1, as well as from FIG. 2, the gas stream perturbation device 10 is designed as propeller shaped plate 14 with a centrally arranged plate portion 15 at which circumferential blades 16a, b, c and d are arranged. An outer rim 18 of the blades 16 is fixed to an inner wall of the housing 2 and seals fluidly the gas stream perturbation device 10 to the inside of the housing 2. As can be further seen from FIG. 1 as well as from the enlarged illustration of the gas stream perturbation device 10 shown in FIG. 2, the blades 16 further comprise a leading edge 20 and an effluent edge 22. The leading edge 20a of one blade 16a and the effluent edge 22b of the adjacent blade 16b define an opening 24a between them through which the gas stream C may exit chamber 12. Downstream of the gas stream perturbation device 10 a so-called gas perturbation development chamber 26 (see FIG. 1) is arranged in which the perturbation induced homogenous mixture M develops, before the gas mixture M contacts the catalyst 8.

Thereby, it is preferred if the gas stream perturbation device is arranged in a distance L from the catalyst, wherein a ratio of the distance D to a length L of the housing of the carbon monoxide oxidation device is greater as or equal to 0,2:

$$\frac{D}{L} \geq 0.2.$$

This arrangement allows a sufficiently large perturbation development chamber without increasing the overall length of the carbon monoxide oxidation device.

As can be further seen from FIG. 1 and FIG. 2, the blades 16 are inclined by a predetermined blade inclination angle α in relation to a surface of the plate portion 15 in a circumferential direction. Therefore, the openings 24 are arranged in a more or less axial direction. This in turn provokes that the gas streaming to the plate portion 15 is deflected radially outwards to the more or less axially arranged openings 24 (see arrows). Since the openings are axially arranged a deviation of the gas stream into a tangential direction is induced which in turn results in turbulences downstream of perturbation device 10. These turbulences provide the homogeneous mixture which develops in the perturbation development chamber 26. Therefore, this deviation of the gas stream results in an effective mixing of the gas stream streaming through the housing 2.

Thereby should be noted that in general the homogeneous mixture may be homogeneous in terms of different gas contents and/or in terms of temperature.

Further, as can be seen from FIG. 1 the inventive design of the perturbation device 10 provides a maximized homogeneous mixing by a minimized size of the housing 2. Additionally in contrast to the known carbon monoxide devices only a single plate is necessary for providing both an evenly distributed temperature over the cross section of the reformer as well as a homogenous mixture of the reformat gas and the oxidizing agent. Thereby, it can be ensured that the efficiency of the catalyst and thereby the catalytic reaction is maximized.

Figure 3:
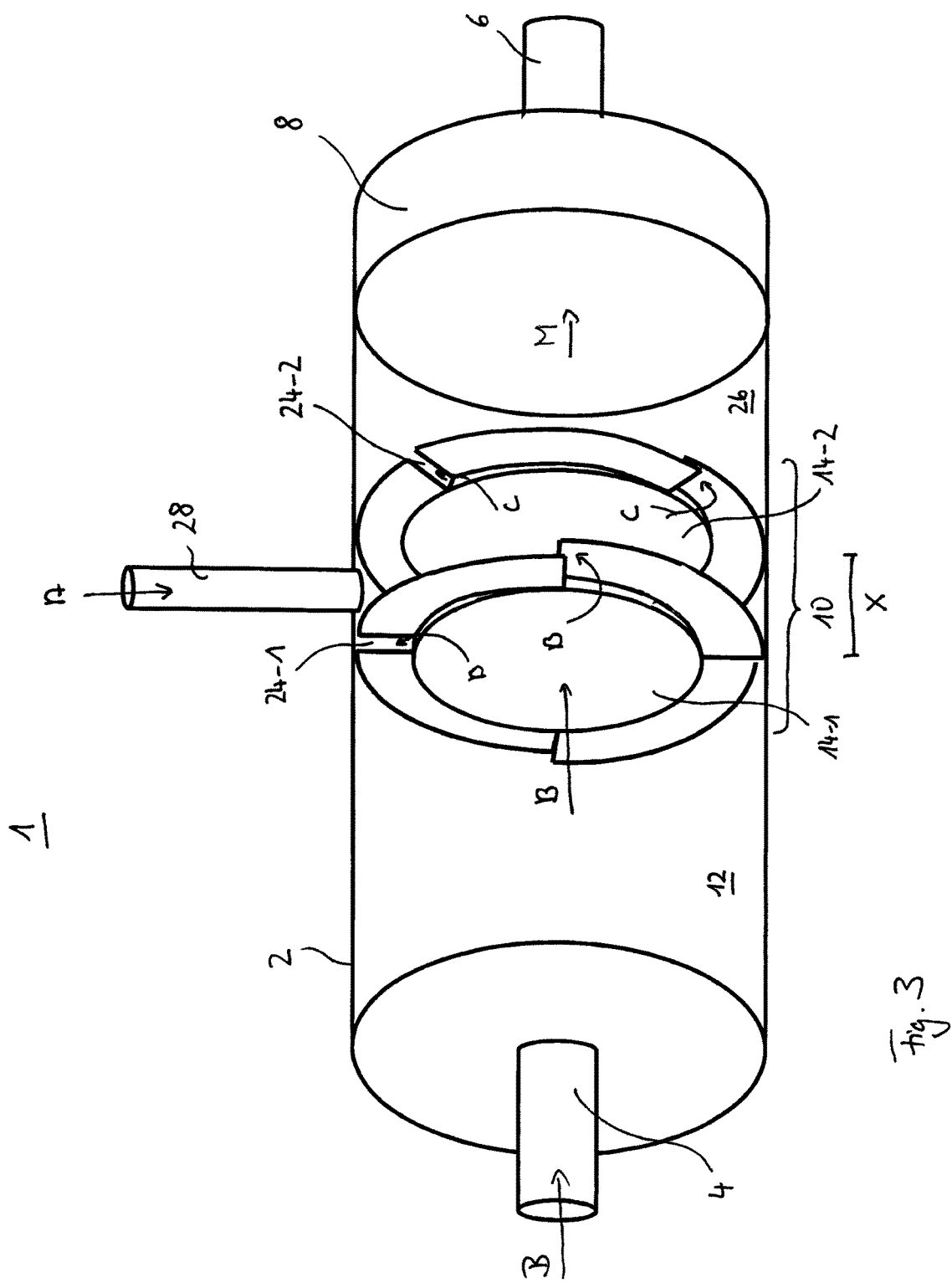
FIG. 3: a further preferred embodiment of the inventive carbon monoxide oxidation device.

FIG. 3 shows a further preferred embodiment of the carbon monoxide oxidation device 1, wherein upstream of catalyst 8, not a single propeller shaped plate 14 but a propeller shaped double plate 14-1; 14-2 is arranged which defines the gas stream perturbation device 10. The propeller-like plates 14-1, 14-2 are separated by a distance X from each other and the openings 24-1, 24-2 are misaligned to each other. As illustrated it is preferred to misalign the openings in such a way that the opening 24-2 of the second plate 14-2 is arranged in the middle between two corresponding openings 24-1 in the first plate 14-1.

Further the oxidizing agent inlet 28 of the illustrated carbon monoxide oxidation device 1 is not arranged upstream of the gas inlet 4 but is designed as separate oxidation agent inlet 28 through which oxidation agent A is introduced into the housing 2. The reformate gas B in turn enters through the gas inlet 4. Even if the oxidation agent inlet 28 may also be arranged upstream of both plates 14-1, 14-2 the double plate arrangement of FIG. 3 allows for the depicted embodiment, wherein the oxidation agent inlet 28 is arranged between both plates 14-1 and 14-2. Thereby, reformat gas entering the housing through gas inlet 4 streams through the first plate 14-1. The oxidizing agent A is then introduced into the perturbed reformat gas stream B downstream of the first plate 14-1 whereby a premixing of reformat gas B and oxidizing agent A takes places. This pre-mixture C is then forced through the openings 24-2 of the second plate 14-2, whereby the desired homogeneous mixture M is provided to the catalyst 8.

However, even if the oxidizing agent inlet 28 is illustrated as being arranged between the plates 14-1 and 14-2, the oxidizing agent inlet 28 may also be arranged upstream of gas inlet 4 as shown in FIG. 1, wherein oxidizing agent A and reformat gas B are mixed before the gas mixture C enters the housing 2. It should be further noted that also in the arrangement shown in FIG. 1 the oxidizing agent inlet 28 may be arranged upstream of the gas perturbation device 10 but downstream of gas inlet 4.

With the above described gas distribution device a carbon monoxide oxidation device may be provided, which has a high efficiency but a minimal length. Thereby, the gas stream perturbation device mixes only small amounts of oxidizing agent and shows an extremely low pressure drop. This in turn allows for a reduced compressor power, which also increases the efficiency of the system. Since the gas stream perturbation device also provides a very homogenous mixture only a minimal amount of oxidizing agent needs to be introduced into the reformat gas for oxidizing carbon monoxide so that the amount of hydrogen which is oxidized by excess oxidation agent is further decreased.

REFERENCE NUMBER LIST 1 carbon monoxide oxidation device
2 housing
4 gas inlet
6 gas outlet
10 gas stream perturbation device
12 chamber
14 plate portion
16 blade
18 blade rim
20 leading edge
22 effluent edge
24 opening
26 gas perturbation development chamber
28 oxidizing agent inlet
A oxidizing agent
B reformate gas
C oxidizing agent/reformat gas mixture
M Homogenous mixture
D distance between gas stream perturbation device and catalyst
L length of the housing of the carbon monoxide oxidation device
X distance between propeller-shaped plates

The invention claimed is:

1. Water gas shift reactor or preferential oxidation reactor, which purifies a carbon monoxide containing hydrogen rich reformat gas from carbon monoxide contained in the carbon monoxide containing hydrogen rich reformate gas, wherein the water gas shift reactor or the preferential oxidation reactor comprises a housing, wherein the housing a. incorporates an oxidation catalyst, which oxidizes the carbon monoxide of the carbon monoxide containing hydrogen rich reformat gas by means of an oxidizing agent to carbon dioxide, b. comprises upstream of the catalyst at least one gas inlet for providing a gas stream (B; C) of at least the carbon monoxide containing hydrogen rich reformat gas into the housing, c. comprises downstream of the catalyst a gas outlet for exiting purified hydrogen rich gas from the housing, and d. incorporates a gas stream perturbation device which is arranged upstream of the catalyst and which is adapted to provide a perturbation in the gas stream, wherein the gas stream perturbation device is designed as at least one propeller-shaped plate with a plate portion having a surface facing the gas stream and at least one circumferentially extending blade which is connected to the plate portion and has a radially extending leading edge and a radially extending effluent edge which are aligned with a central axis of the gas stream perturbation device, wherein a surface defined between leading edge and effluent edge is inclined in relation to the surface of the plate portion with a predetermined blade inclination angle, thereby defining at least one opening in the plate, the opening being defined between the leading edge and the effluent edge and being substantially aligned with the axis of the gas stream perturbation device.

2. Water gas shift reactor or preferential oxidation reactor according to claim 1, wherein the at least one blade of the gas stream perturbation device is inclined in circumferential direction.

3. Water gas shift reactor or preferential oxidation reactor according to claim 1, wherein the gas stream perturbation device is stationary mounted inside the housing with its outer circumferential rim being sealed to an inner wall of the housing.

4. Water gas shift reactor or preferential oxidation reactor according to claim 1, wherein the plate portion is centrally arranged in a radial direction in the housing and the at least one blade is arranged between the centrally arranged plate portion and an inner wall of the housing.

5. Water gas shift reactor or preferential oxidation reactor according to claim 1, wherein the gas stream perturbation device comprises at least two equally spaced blades.

6. Water gas shift reactor or preferential oxidation reactor according to claim 1, wherein the gas stream perturbation device is substantially disk-shaped.

7. Water gas shift reactor or preferential oxidation reactor according to claim 1, wherein the gas stream perturbation device comprises a first and a second propeller-shaped plate, wherein the at least first and second openings defined in the plates are misaligned.

8. Water gas shift reactor or preferential oxidation reactor according to claim 1, wherein the housing further comprises an oxidation agent inlet, which is arranged upstream of at least one propeller-shaped plate of the gas stream perturbation device and downstream of the gas inlet.

9. Water gas shift reactor or preferential oxidation reactor according to claim 1, wherein the gas stream perturbation device is arranged in a predetermined distance from the catalyst, thereby defining a perturbation development chamber for the gas stream.

10. Water gas shift reactor or preferential oxidation reactor according to claim 9, wherein the gas stream perturbation device is arranged in a distance from the catalyst, wherein a ratio of a distance to a length of the housing is greater as or equal to $$0.2\left(\frac{D}{DL} \geq 0.2\right).$$

* * * * *